US006989786B1

(12) United States Patent
Dong

(10) Patent No.: US 6,989,786 B1
(45) Date of Patent: Jan. 24, 2006

(54) SATELLITE ANTENNA STATION KEEPING

(75) Inventor: Guibin Dong, Rockville, MD (US)

(73) Assignee: Intelsat Global Service Corporation, Washington, DC (US)

( * ) Notice: Subject to any disclaimer, the term of this patent is extended or adjusted under 35 U.S.C. 154(b) by 0 days.

(21) Appl. No.: 10/879,706

(22) Filed: Jun. 30, 2004

(51) Int. Cl.
*H04B 7/185* (2006.01)

(52) U.S. Cl. ...................................... 342/354; 342/352

(58) Field of Classification Search ................. 342/81, 342/154, 157, 352, 354
See application file for complete search history.

(56) References Cited

U.S. PATENT DOCUMENTS 4,418,350 A 11/1983 Rosen
5,184,139 A 2/1993 Hirako et al.
5,587,714 A 12/1996 Chu et al.
5,589,834 A * 12/1996 Weinberg .................. 342/354
5,765,098 A * 6/1998 Bella ......................... 455/13.3
5,999,127 A * 12/1999 Dezelan ...................... 342/359
6,393,255 B1 5/2002 Lane
6,567,040 B1 5/2003 Sevaston
6,726,152 B2 * 4/2004 Higgins .................. 244/158 R

* cited by examiner

*Primary Examiner*—Dao Phan
(74) *Attorney, Agent, or Firm*—Sughrue Mion, PLLC

(57) ABSTRACT

Techniques for redirecting a satellite antenna beam from a satellite antenna of a satellite in an inclined orbit to a preferred satellite antenna beam pointing position on the earth are provided. Satellite antenna maneuver data is computed based upon information associated with the satellite, such as telemetry, orbital, and antenna nominal pointing information. Command code sequences are then generated that correspond to the maneuver data. The command codes are executable at the inclined orbit satellite to modify the antenna position. The generated command codes are then transmitted to the inclined orbit satellite to redirect the satellite antenna beam center to the preferred position.

20 Claims, 13 Drawing Sheets

505
Antenna Driver
412
Communi cation Antenna
501
TT&C Unit
510
TT&C Antenna 507
Modulated antenna control command signal
Telemetry Signal
405
Telemetry Data
410
Measured Orbital Data
Control Center
TT&C Station
Antenna Control Command Signal Figure 1 (Prior Art) Antenna Pointing on Earth of a Satellite at 50.5 E

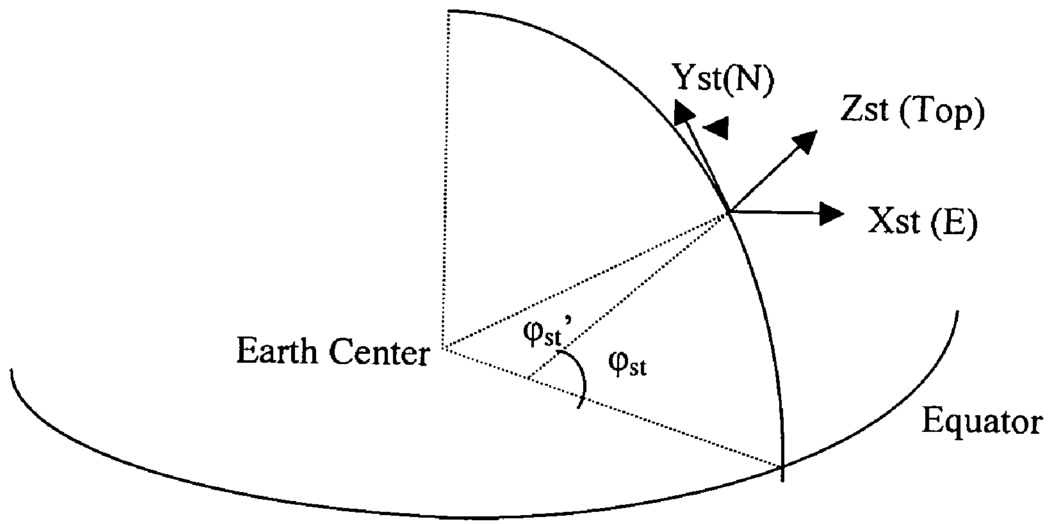
Figure 7 Earth Station Top Centric Frame(Xst, Yst, Zst)
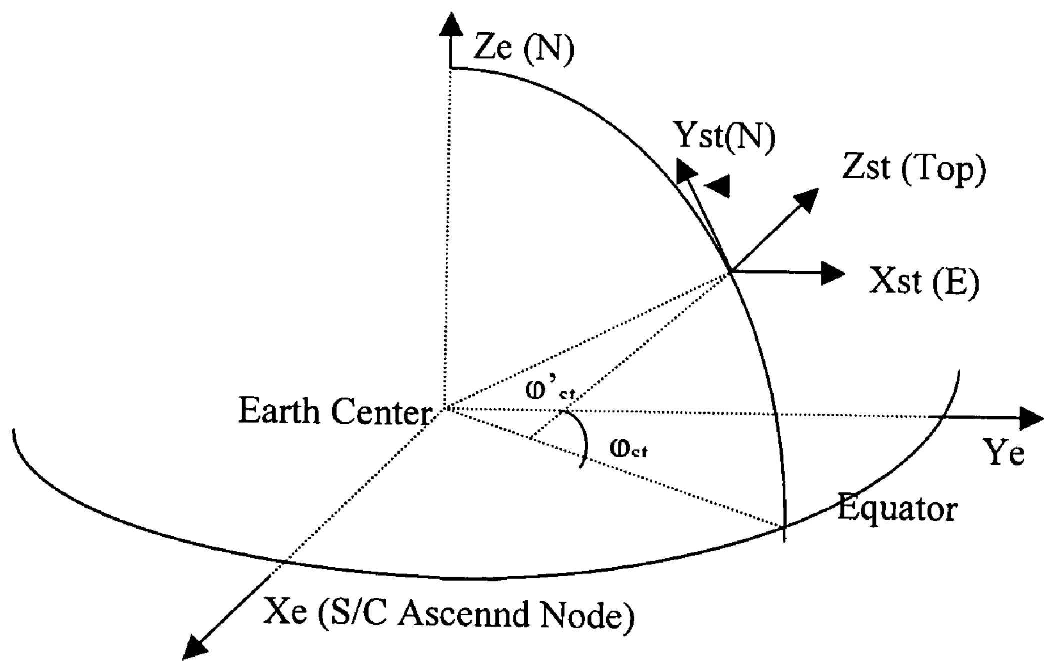
Figure 8 Earth Centric Frame(Xe, Ye, Ze)

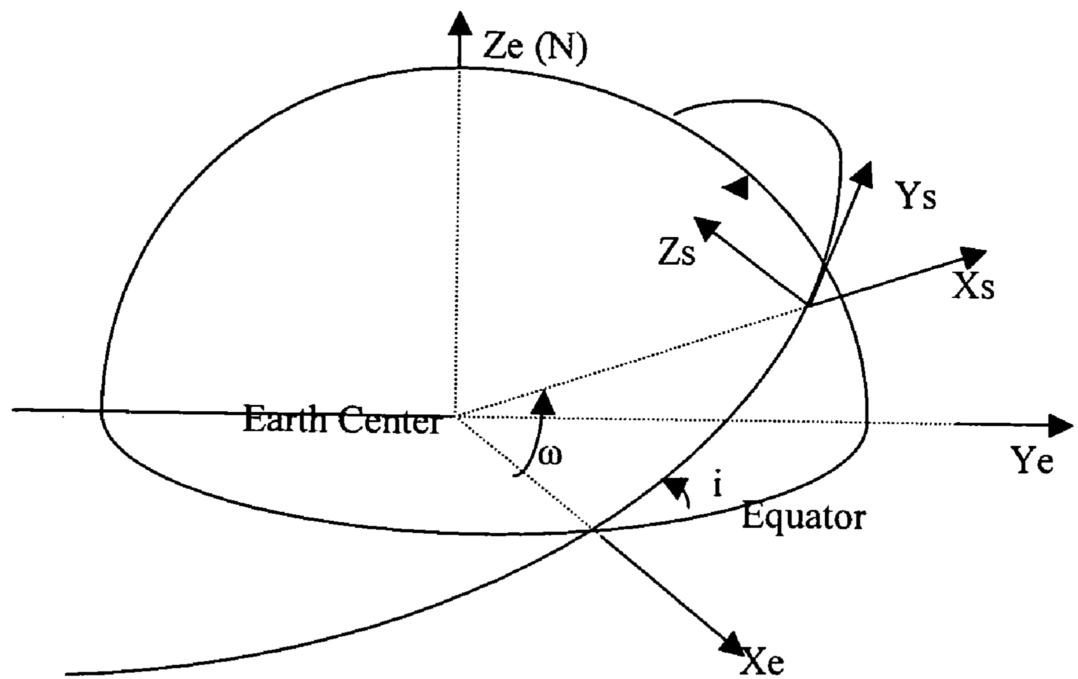
Figure 9 Satellite Centric Frame (Xs, Ys, Zs)
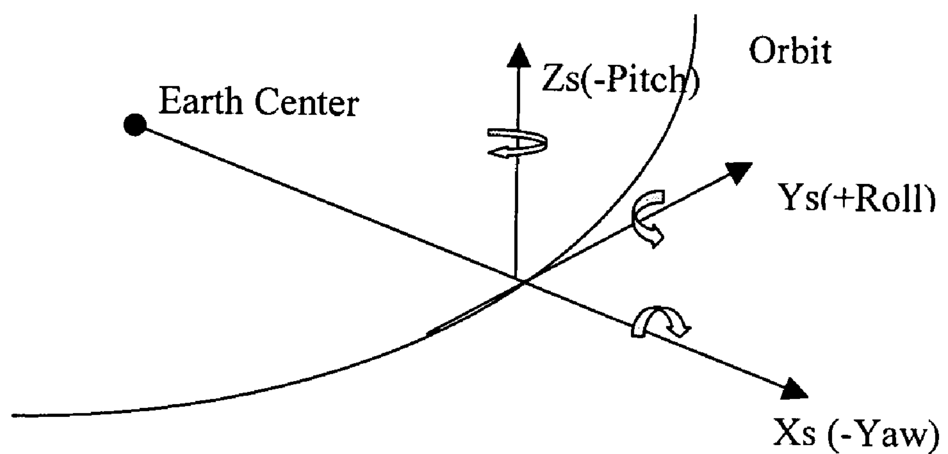
Figure 10 Satellite Attitude Angles (Roll, Pitch and Yaw)

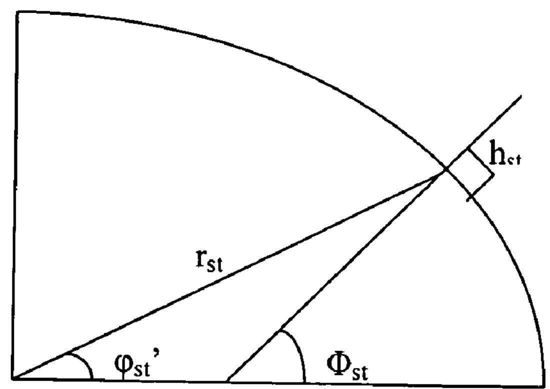
Figure 11 Geometry for $\varphi_{st}$, $\varphi'_{st}$ and $h_{st}$
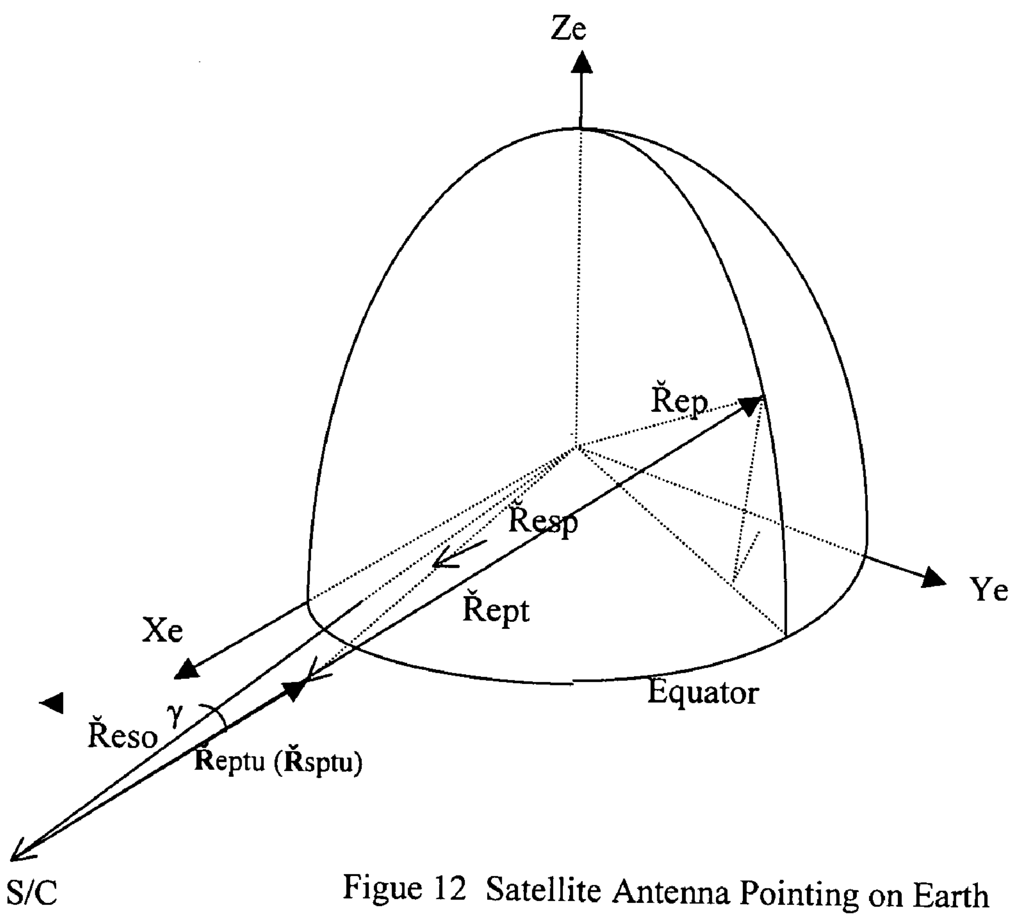
Figue 12 Satellite Antenna Pointing on Earth Diagram of SACK Algorithm

Figure 14 Daily 2-Corrections, Antenna Pointing on Earth of a Satellite at 50.5 E with I=6.54
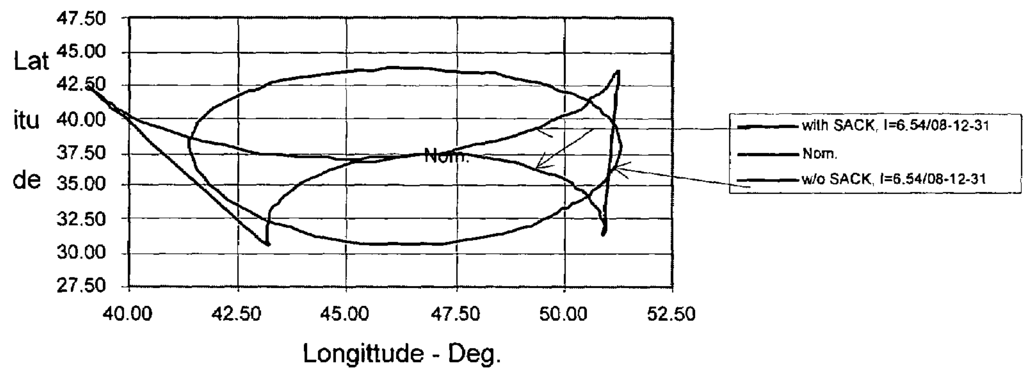
Figure 15 Daily 4-Corrections, Antenna Pointing on Earth of a Satellite at 50.5 E with I=6.54
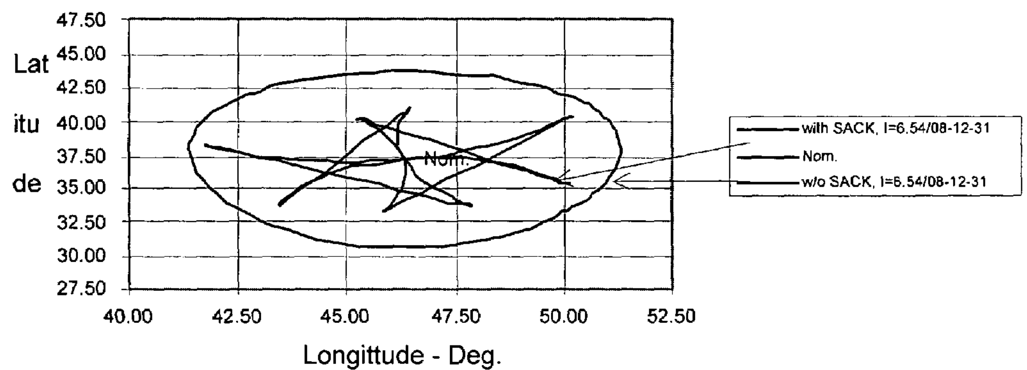

Figure 16 Daily 8-Corrections, Antenna Pointing on of a Satellite at 50.5 E with I=6.54
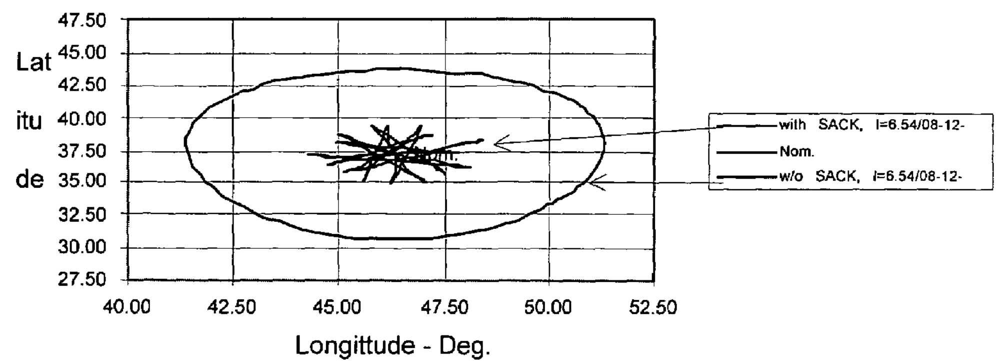
Figure 17 Daily 16-Corrections, Antenna Pointing on Earth of a Satellite at 50.5 E with I=6.54
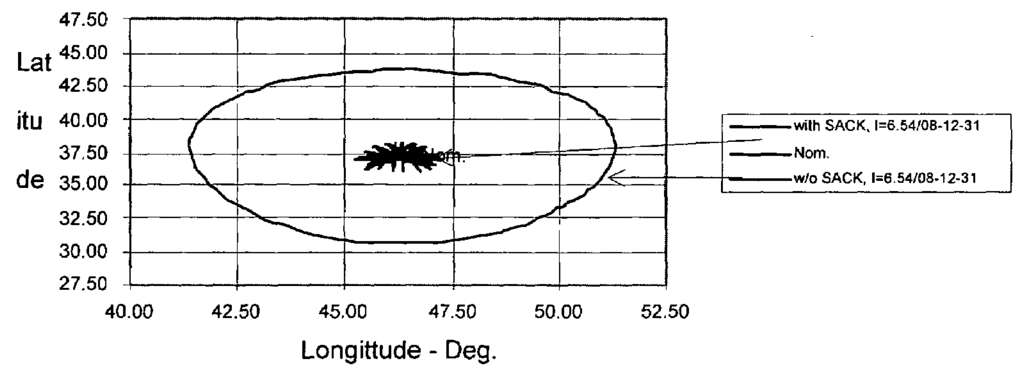

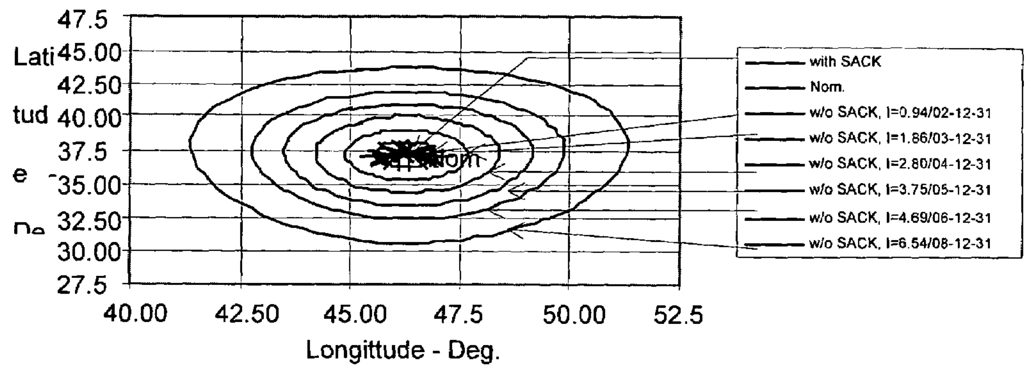
Figure 18 Daily 16-Corrections, Antenna Pointing on of a Satellite at 50.5 E with I=6.54
Latitude - Deg.
47.5
45.00
42.50
40.00
37.5
35.00
32.50
30.00
27.5
40.00
42.50
45.00
47.5
50.00
52.5
Longittude - Deg.
with SACK
Nom.
w/o SACK, I=0.94/02-12-31
w/o SACK, I=1.86/03-12-31
w/o SACK, I=2.80/04-12-31
w/o SACK, I=3.75/05-12-31
w/o SACK, I=4.69/06-12-31
w/o SACK, I=6.54/08-12-31
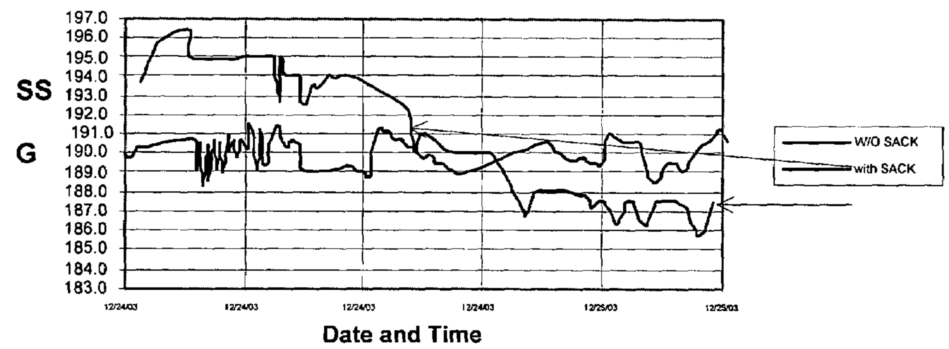
Figure 19 SSG Comparison of Transponder 62/62 of a Satellite at 340.05
SSG
197.0
196.0
195.0
194.0
193.0
192.0
191.0
190.0
189.0
188.0
187.0
186.0
185.0
184.0
183.0
Date and Time
W/O SACK
with SACK

SATELLITE ANTENNA STATION KEEPING

FIELD OF THE INVENTION

The present invention is related to satellite antenna beam positioning, and more particularly to satellite antenna beam positioning to compensate for satellite antenna pointing deviation on the earth resulting from a satellite in an inclined orbit.

BACKGROUND OF THE INVENTION

During optimal operation a satellite antenna beam center or pointing position on the earth is kept within a small box in both directions of North-South and East-West around its nominal position. When a beam center position is within this optimal box, the beam coverage on the earth is stable, communications between the earth station and the satellite are stable and earth station antennas do not have to be often repositioned for tracking the satellite to maintain stable communications.

Electronic equipment on board a satellite is designed to function quite a long time. Thus, the determining factor of a satellite's operational lifespan is not electronic equipment life, but rather station-keeping fuel supply. Station-keeping is the process of adjusting a satellite's orbital position such that the satellite's position relative to the earth falls within acceptable parameters. When the station-keeping fuel is exhausted the satellite's useful life comes to an end.

The amount of station-keeping fuel necessary to perform satellite North-South position correction (inclination correction) is much more than that necessary for East-West position correction. Thus, it is a common practice that only East-West position correction is performed when the fuel on board the satellite is close to exhaustion. The lack of North-South position correction forces the satellite into an inclined orbit. Without North-South position correction, the satellite's orbital inclination will increase about 0.9° per year. As an example, Table 1 shows predicted date and inclination values for a satellite positioned at 52.50° E in an inclined orbit.

TABLE 1

Inclinations of a Satellite at 50.50° E

| Date | Predicted Inclination (Degrees) |
|---|---|
| Dec. 31, 2002 | 0.94 |
| Dec. 31, 2003 | 1.86 |
| Dec. 31, 2004 | 2.80 |
| Dec. 31, 2005 | 3.75 |
| Dec. 31, 2006 | 4.69 |
| Dec. 31, 2008 | 6.54 |

While a satellite is in an inclined orbit, the satellite's position relative to the earth keeps moving. This movement causes degradations in communications performance between the satellite and the earth station. More particularly, relative position movement due to an inclined orbit causes the satellite looking angles (azimuth and elevation) from an earth station to change as the satellite's relative position moves, resulting in changes of the earth station antenna gain toward the satellite. This causes communication performance degradation. The earth station antenna has to keep tracking the satellite, i.e., be repeatedly repositioned to stay in contact with the satellite, in order to solve this problem.

Another problem arising from satellite relative position movement is that the satellite's polarization direction at the earth station changes as the satellite's relative position moves. This also results in the communication performance degradation. The earth station antenna has to keep tracking the satellite's polarization direction in order to solve this problem. However, polarization direction usually does not cause great performance degradation within a reasonable range of inclination.

Satellite relative position movement also causes looking angles (azimuth and elevation) from the satellite toward an earth station to change as the satellite's relative position changes due to the inclined orbit. This results in changes of the satellite antenna's gain toward the earth station, which also contributes to communication performance degradation.

If a satellite has a zero inclination and is in a perfect geo-stationary orbit, the satellite antenna's beam pointing position on the earth will be at the nominal position constantly. However, when a satellite is in inclined orbit, the beam pointing position on the earth will be off from the nominal position and move with time on an ellipse. The shape and size of the ellipse depends on the beam pointing position relative to the satellite sub-point, which is a point on the earth having same latitude and longitude as the satellite, and on the inclination magnitude.

FIG. 1 shows, as an example, a nominal antenna beam pointing position at 37.18° N in latitude and 46.27° E in longitude for a satellite at 52.50° E. Six ellipses of antenna beam pointing around the nominal position are shown in FIG. 1 for inclinations listed in Table 1 (shown above). The movement of the antenna beam pointing position will cause beam coverage on the earth to move accordingly, resulting in a change of the satellite antenna gain toward an earth station, in turn causing communication performance degradation, especially at beam edge. As shown, the larger the inclination, the larger the ellipse. With a larger ellipse comes an increase in communication performance degradation.

FIG. 2 is another view of a satellite's beam center position path 1 around a desired beam center position (shown as Washington D.C.) for a satellite in an inclined orbit. In a particular inclined orbit the beam center is moving around the path 1. Rings A show the satellite antenna gain contours when the satellite is at 12:00 o'clock. Rings B show the satellite antenna gain contours when the satellite is at 6:00 o'clock position. And, rings C show the satellite antenna contours when the satellite is at 0:00 o'clock position.

As shown, at the 0:00 o'clock location of the beam center, the signal received at D.C. has a 5 db loss, with the beam center at the 6 o'clock location, the loss in D.C. is a 4 db, and with the beam center at the 12 o'clock location the loss at Washington D.C. is approximately 3 db. Typically, a loss of 4 or 5 db is unacceptable. That is, a satellite's signal is not usable due to degradation when the satellite is in a position resulting in such a loss.

Turning to FIG. 3 it has been proposed to solve the above-mentioned problems by transmitting a beacon signal 100 from an earth station 110 to a satellite's antenna 120. As shown, satellite antenna 120 has a center target point 122. However, as also shown, the beacon signal 100 is actually centered at point 122A on the face of the satellite antenna 120, and accordingly, an offset exists between the desired location 122 of the beacon signal 100 on the satellite antenna 120 and the actual location 122A of the beacon signal 100 on the satellite antenna 120. After receipt at the satellite, the beacon signal 100 is transmitted to an onboard satellite tracking receiver 130 which detects the beacon signal 100, and based upon signal parameters (magnitude and sign), determines the offset between point 122 and 122A. The satellite tracking receiver 130 then generates a satellite antenna drive signal to correct the azimuth and elevation angles of the satellite antenna 120. This generated antenna drive signal is transmitted to an on-board antenna drive unit 140 which drives the satellite's antenna 120 to correct its azimuth and elevation angles in order to move antenna 120 such that the beacon signal 100 is centered on desired point 122, thereby eliminating the offset in the beacon signal 100 receiving location and the desired beacon signal 100 receiving location at the antenna 120.

This proposed solution requires substantial additional hardware to be installed on-board the satellite which adds weight and complexity to the satellite and also potentially decreases reliability. However, an even greater problem arises due to the fact that the satellite antenna 120 will necessarily be redirected during the life of the satellite to move the spot beam to different locations on the earth's surface from time to time. For example, referring back to FIG. 2, there may be a time when it will be desirable to have the spot beam centered on Chicago rather than Washington D.C. Accordingly, the earth station 110 from which the beacon signal 100 is transmitted would need to move each time that the spot beam was moved. Such movement of the beacon station makes the proposed solution impractical and virtually impossible to implement successfully.

Accordingly, a need remains for a technique which does not require a beacon signal to maintain a position of an antenna footprint at the earth's surface at a desired location when the satellite is in an inclined orbit.

OBJECTS OF THE INVENTION

It is an object of the present invention to provide a technique for satellite antenna beam positioning for a satellite in an inclined orbit.

It is also an object of the present invention to provide a technique for satellite antenna beam positioning for a satellite in an inclined orbit without additional hardware both on satellite and on ground.

Still another object of the present invention is to provide a technique for satellite antenna beam positioning for a satellite in an inclined orbit which does not require the use of station-keeping fuel.

It is another object of the present invention to provide a technique for satellite antenna beam positioning for a satellite in an inclined orbit which does not require a beacon signal.

Yet another object of the present invention is to provide a technique for satellite antenna beam positioning for a satellite in an inclined orbit which provides stable satellite antenna beam coverage over earth stations.

The above-stated objects, as well as other objects, features, and advantages, of the present invention will become readily apparent from the following detailed description which is to be read in conjunction with the appended drawings.

SUMMARY OF THE INVENTION

In accordance with the present invention, a method, satellite control center, and article of manufacture are provided for redirecting a satellite antenna beam from a satellite antenna of an inclined orbit satellite to a nominal satellite antenna beam pointing position on the earth's surface. That is, a satellite antenna beam that does not point in a desired pointing position on the earth's surface, due to the satellite being in an inclined orbit, is redirected to point in the desired position utilizing techniques provided by the present invention.

The satellite control center of the present invention includes an interface for receiving information associated with the inclined orbit satellite, a transmitter for communicating with the inclined orbit satellite, and a processor for processing information associated with the inclined orbit satellite. The processor can be any type of processor capable of functioning to implement at least a portion of the method disclosed herein, including, but not limited to, a processor as found in a typical personal computer, mainframe computer, server-type computer, or any other type computing device.

The technique of the present invention requires that satellite antenna maneuver data be computed based upon telemetry, orbital, and satellite antenna nominal pointing information associated with the inclined orbit satellite. The generated satellite antenna maneuver data is associated with at least azimuth and elevation angles of the satellite antenna. After the maneuver data has been computed, command code sequences that correspond to that maneuver data are generated. These command code sequences are executable at the inclined orbit satellite to modify the azimuth and elevation angles of the satellite antenna. That is, the command code sequences cause the satellite antenna to be moved in accordance with the azimuth and elevation angles associated with the computed maneuver data.

The generated command codes are then transmitted to the inclined orbit satellite to redirect the center of the satellite antenna beam toward and close to the desired satellite antenna beam pointing position on the earth's surface. Thus, an execution of the command code sequences causes the satellite antenna beam to move such that the beam center more precisely falls on the desired position on the earth's surface, correcting for improper satellite antenna beam positioning due to the satellite being in an inclined orbit.

According to one aspect of the present invention, the satellite telemetry, orbital, and satellite antenna nominal pointing information includes satellite attitude data, satellite orbit element data, and one of: target latitude and target longitude of the satellite antenna beam, or target azimuth and target elevation angles of the satellite antenna.

In a further aspect of the invention, the satellite orbit element data includes a plurality of satellite orbit parameters. In one preferred embodiment, the plurality of satellite orbit parameters is the Intelsat eleven parameter satellite ephemeris. However, as desired, other satellite orbit element data could be utilized.

According to another aspect of the present invention, the computed satellite antenna maneuver data includes at least three types of data. The first type of included data indicates a number of satellite antenna maneuvers to be performed in a time period. That is, this first type of data indicates a number of times within a given period that the satellite antenna is to be moved. The second type of included data indicates a time at which to perform each of the satellite antenna maneuvers. The third type of included data indicates azimuth and elevation angles for each of the number of satellite antenna maneuvers. That is, this third type of information indicates new positional information for the satellite antenna.

In still another aspect of the present invention, the satellite antenna maneuver data is computed by performing multiple coordinate frame transformations. In a further aspect, first parameters are defined by performing an earth station top centric frame to satellite centric frame transformation based on the nominal satellite antenna beam pointing position on the earth's surface and a satellite inclination value of zero. Thus, this transformation is made not taking into account the value of the inclination of the inclined satellite.

Once the first parameters are defined, a satellite centric frame to earth centric frame transformation, based on the defined first parameters and the actual satellite inclination value, is performed to define second parameters. Next, an earth station top centric frame to satellite centric frame transformation is performed. This next frame transformation, made based upon the defined first and second parameters and the actual satellite inclination values, generates a first portion of the antenna maneuver data.

Following the generation of the first portion of the antenna maneuver data, a satellite centric frame to earth centric frame transformation is performed, based upon the generated first portion of the antenna maneuver data. This transformation generates a second portion of the antenna maneuver data.

In a still further aspect of the present invention, the generated first portion of the antenna maneuver data identifies a number of the maneuvers to be performed in a given time period, as well as identifies target azimuth and elevation angles for each of the number of satellite antenna maneuvers. Thus, for each of the number of maneuvers, a desired time as well as desired ending azimuth and elevations angles are identified by the first portion. Also in this further aspect, the generated second portion of the antenna maneuver data identifies a time at which to perform each of the number of satellite antenna maneuver.

According to yet another aspect of the present invention, the satellite antenna maneuver data is computed by defining an ellipse formed on the earth's surface by the satellite antenna beam pointing position due to the inclined orbit of the satellite. That is, because the satellite is in an inclined orbit, the satellite beam path on the earth forms an ellipse on the earth's surface. In this aspect, the defined ellipse is segmented into a plurality of arcs. Then, each of the arcs is moved to the nominal satellite antenna beam pointing position on the earth's surface. After the move, angular distances from points on each moved arc to the nominal satellite antenna beam pointing position are determined. The determined distances are then utilized in computing the satellite antenna maneuver data.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.)

BRIEF DESCRIPTION OF THE DRAWINGS

In order to facilitate a fuller understanding of the present invention, reference is now made to the appended drawings. These drawings should not be constructed as limiting the present invention, but are intended to be exemplary only.

FIG. 7 depicts an earth station top centric frame.

FIG. 8 depicts an earth centric frame.

FIG. 9 depicts a satellite centric frame.

FIG. 10 depicts satellite attitude angles.

FIG. 11 depicts a geometric expression of the earth flatness.

FIG. 12 depicts a geometric expression of vectors describing the satellite antenna pointing, shown in FIGS. 4 and 5.

FIG. 14 is a first depiction of predicted results of the SACK technique of the present invention.

FIG. 15 is a second depiction of predicted results of the SACK technique of the present invention.

FIG. 16 is a third depiction of predicted results of the SACK technique of the present invention.

FIG. 17 is a fourth depiction of predicted results of the SACK technique of the present invention.

FIG. 18 is a fifth depiction of predicted results of the SACK technique of the present invention.

FIG. 19 shows test data results from implementing the SACK technique of the present invention.

DETAILED DESCRIPTION OF A PREFERRED EMBODIMENT

Figure 4:
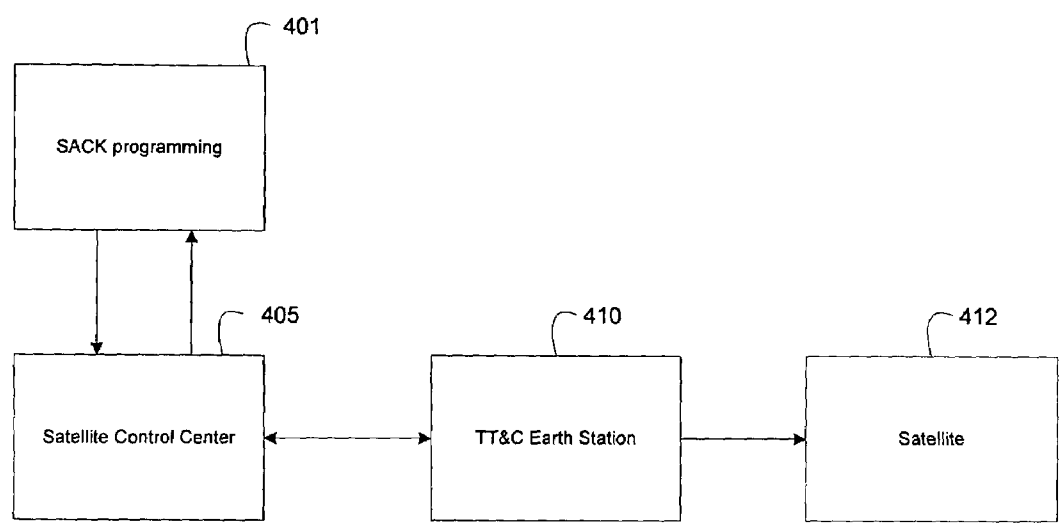
FIG. 4 is a simplified depiction of a technique for satellite antenna beam coverage keeping (SACK) in accordance with certain aspects of the present invention.

A new technique of satellite antenna pointing stabilization, called Satellite Antenna Coverage Keeping (SACK), is provided by the present invention for keeping satellite antenna beam pointing close to its nominal beam pointing position on the earth when the satellite is in an inclined orbit, resulting in keeping antenna coverage on the earth stable. SACK compensates for the beam pointing deviation caused mainly by satellite inclination. FIG. 4 shows a simplified overview block diagram of SACK implementation.

A SACK program 401 receives satellite data from a Satellite Control Center 405. The received data includes Intelsat Eleven Parameter Satellite Ephemeris or other type of satellite orbit elements; satellite attitude data (Time, Roll, Yaw and Pitch angles); antenna nominal beam pointing position on the earth (latitude and longitude) or on satellite (azimuth and elevation). The SACK program 401 generates antenna beam pointing maneuver data using the received data and transmits the maneuver data to the Satellite Control Center 405. The maneuver data includes daily maneuver numbers and maneuver performance time, as well as satellite antenna azimuth and elevation angles for each maneuver.

The satellite control center 405 generates command code sequences according to the received maneuver data and transmits the command code sequences to the satellite via a conventional TT&C (Tracking, Telemetry & Command) earth station 410. The satellite 412 then adjusts its antenna pointing direction (azimuth and elevation) according to the command code sequences received from the TT&C earth station 410.

Figure 5:
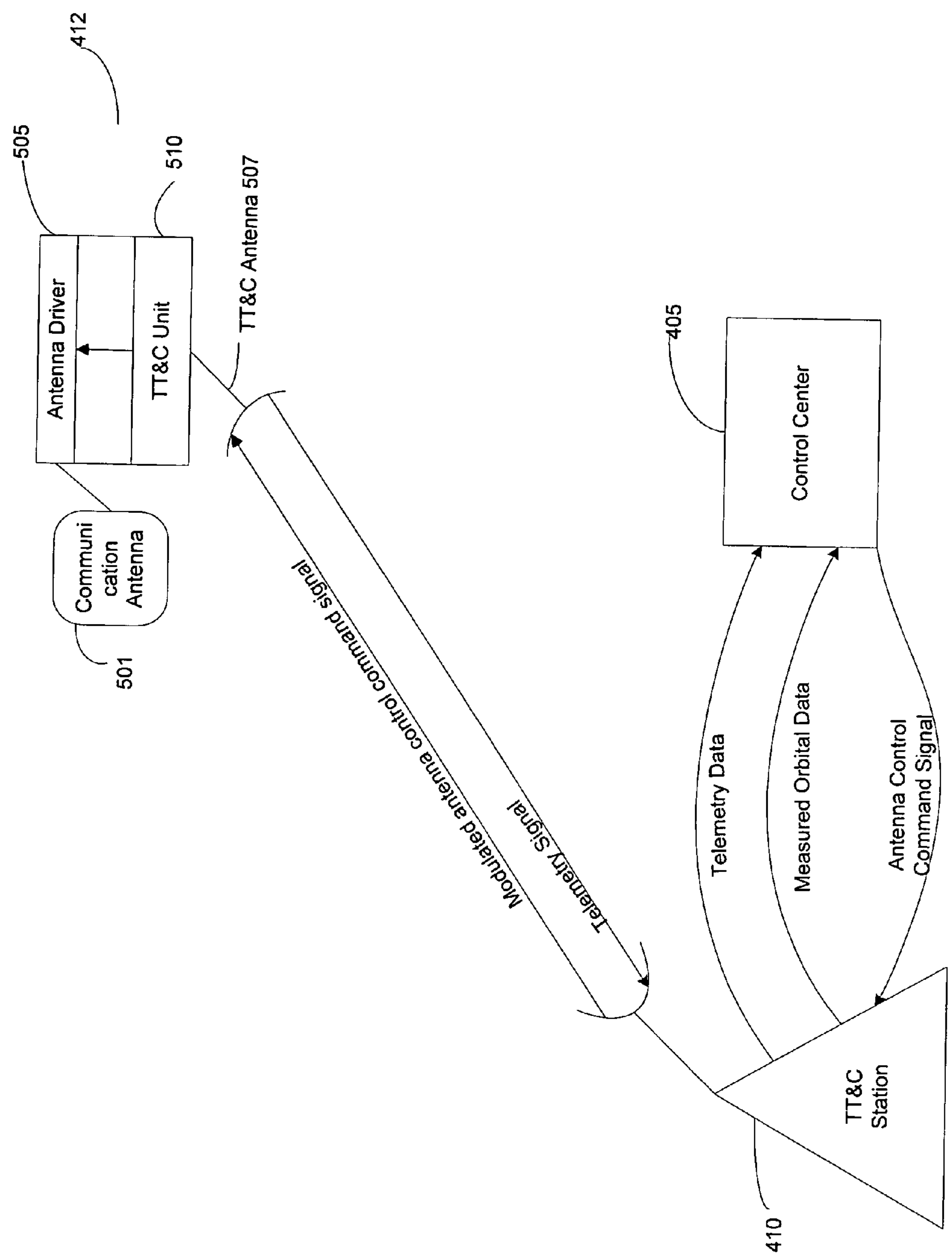
FIG. 5 is a simplified depiction of certain communications associated with the satellite antenna beam coverage keeping technique of the present invention.
Figure 6:
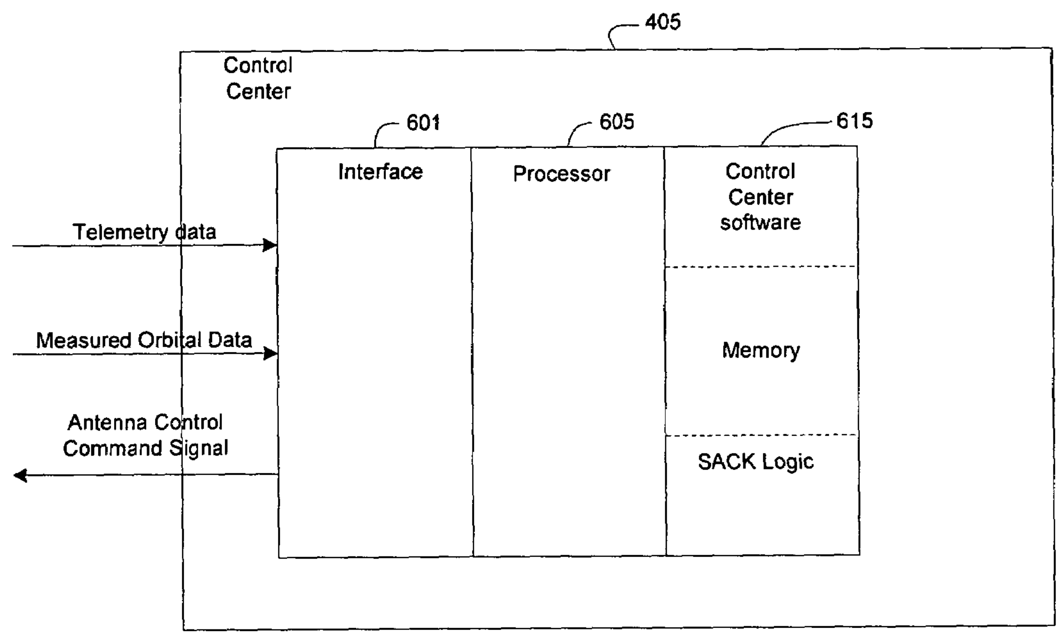
FIG. 6 is an exemplary depiction of a computing device usable at the control center depicted in FIG. 4.

FIGS. 5 and 6 depict a system for controlling the satellite 412 in accordance with the present invention. As shown, the satellite 412 includes a conventional movable communication antenna 501 driven by a conventional antenna driver

505. The satellite 412 also includes a conventional TT&C antenna 507 and an associated conventional TT&C unit 510. The TT&C antenna 507 transmits telemetry to and receives command data from the TT&C earth station 410. The TT&C earth station 410 further transmits the received telemetry data to the satellite control center 405. The satellite control center 405 processes the telemetry data and generate antenna control command signals accoding to the data from SACK program, which are transmitted to the TT&C station 410, modulated at the TT&C station 410 and further transmitted as a modulated antenna control command signal to the satellite TT&C antenna 507. The received signal on satellite is then forwarded to the TT&C unit 510 which generates a corresponding antenna drive signal which is passed to the antenna driver 505 which accordingly drives a change in the communication antenna 501 to realign the antenna 501 on a target point, as will be detailed further below.

The TT&C station 410 also measures satellite orbit (azimuth and elevation, range and rang rate) and transmits this measured orbital data to the control center 405. The control center generates the orbital data (Intelsat Eleven Parameter Satellite Ephemeris, six orbital element parameters or position and speed vectors) and attitude data(Roll, Yaw and Pitch angles) from the measured orbital and attitude data received from the TT&C station 410. The control center generated orbital data and attitude data are processed by the SACK program to generate the antenna control data.

FIG. 6 is a more detailed but still simplified depiction of the satellite control center 405 shown in FIGS. 4 and 5. As shown, the telemetry data and measured orbital data are input to the control center 405 via an interface 601. The interface 601 is interconnected to a processor 605 for processing the data in accordance with conventional control center programming stored in a memory 615. The SACK programming provides the logic for generating the antenna control data in accordance with the present invention will be described in more detail below.

The antenna driver 505 is an electrical power driven mechanism. The antenna driver 505, as introduced above, is used for antenna pointing direction adjustment. Many current satellites have such a unit 505 for spot beam antennas. The unit 505 uses electrical power supplied by a solar array of the satellite 412, it does not use station-keeping fuel. Thus, satellite antenna 501 can be maneuvered many times without depleting station-keeping fuel. The present invention utilizes this fact to full advantage.

A SACK algorithm, implemented by the SACK programming 401, will be described below. The Intelsat eleven satellite ephemeris is used by the SACK algorithm in the following description, though other type of orbital data also can be used. The utilized data includes: $L_0$, Mean Longitude (East of Greenwich), Degree; $L_1$, Drift Rate, Degree/Day; $L_2$, Drift Acceleration, Degree/Day$^2$; $L_c$, Longitude Oscillation-amplitude, Degree; $L_{c1}$, and rate of change, Cos term, Degree/Day; $L_s$, Longitude Oscillation-amplitude, Degree; $L_{s1}$, and rate of change, Sin term, Degree/Day; $l_c$, Latitude Oscillation-amplitude, Degree; $l_{c1}$, and rate of change, Cos term, Degree/Day; $l_c$, Latitude Oscillation-amplitude, Degree; and $l_{s1}$, and rate of change, Cos term, Degree/Day.

From the Intelsat eleven satellite ephemeris, the latitude $\phi_s$ and longitude $\lambda_s$ of the satellite 412 can be calculated from formulae (1) and (2) listed below:

$$\lambda_s=L_0+L_1t_r+L_2t_r^2+(L_c+L_{c1}t_r)\text{Cos}(Wt_r)+(L_s+L_{s1}t_r)\text{Sin}(Wt_r)+(k/2)\ (l_c^2-l_s^2)\text{Sin}(2Wt_r)-klcl_s\text{Cos}(2Wt_r) \quad (1)$$

$$\phi_s(1c+l_{c1}t_r)\text{Cos}(Wt_r)+(l_{s+ls1\ tr})\text{Sin}(Wt_r) \quad (2)$$

with, $W=L_1+360.98564$ degree/day, $k=\pi/360$, $t_{r0}$ being a reference time in day, and $t_r(=t-t_{r0})$ being time in day, staring from $t_{r0}$.

From formulae (1) and (2), the satellite ascent node longitude of $\lambda_{sn}$ and time of $t_{no}$ when the satellite 412 passes the node can be found. The satellite inclination of i can also be found, which is equal to the maximum of $\phi_s$.

Three coordinate frames are used in the calculation. One is the earth station (which could be the TT&C earth station 140, a communication earth station, or any point on the earth to which the satellite antenna center points) top centric frame 701, as shown in FIG. 7. The $X_{st}$ and $Y_{st}$ axes are in the horizontal plane. The $X_{st}$ axis is toward the east, and the $Y_{st}$ axis is toward the north. The $Z_{st}$ axis is determined by the right-hand-rule from the $X_{st}$ and $Y_{st}$ axes.

The second coordinate frame is an inertial earth centric frame as shown in FIG. 8. The $X_e$ and $Y_e$ axes are in the equatorial plane. The $X_e$ axis is toward the ascent node of the satellite 412, and the $Z_e$ axis is toward the north. The $Y_e$ axis is determined by the right-hand-rule from the $X_e$ and $Z_e$ axes. The earth centric frame of FIG. 8 does not rotate with the earth.

The third coordinate frame is a satellite centric frame 901, as shown in FIG. 9. The $X_s$ and $Y_s$ axes are in the satellite's orbital plane. The $X_s$ axis is from the earth center to the satellite 412, and the YS axis is along the moving direction of the satellite 412. The $Z_s$ axis is determined by the right-hand-rule from the $X_s$ and $Y_s$ axes.

The coordinate frames 701, 801 and 901 can be transformed from one to another. The formulae of frame rotation transformations are listed below. $T_x(\alpha)$, $T_y(\alpha)$ and $T_z(\alpha)$ are for rotating an angle $\alpha$ around X, Y and Z axes respectively.

$$Tx(\alpha)=\begin{vmatrix}1 & 0 & 0\\ 0 & \text{Cos}\,\alpha & \text{Sin}\,\alpha\\ 0 & -\text{Sin}\,\alpha & \text{Cos}\,\alpha\end{vmatrix} \quad (3)$$

$$Ty(\alpha)=\begin{vmatrix}\text{Cos}\,\alpha & 0 & -\text{Sin}\,\alpha\\ 0 & 1 & 0\\ \text{Sin}\,\alpha & 0 & \text{Cos}\,\alpha\end{vmatrix} \quad (4)$$

$$Tz(\alpha)=\begin{vmatrix}\text{Cos}\,\alpha & \text{Sin}\,\alpha & 0\\ -\text{Sin}\,\alpha & \text{Cos}\,\alpha & 0\\ 0 & 0 & 1\end{vmatrix} \quad (5)$$

The satellite attitude is described by roll, pitch and yaw angles. They are defined as shown in FIG. 10. Roll is the angle around the $+Y_S$ direction and pitch and Yaw are the angles around the −Zs and −Xs directions, respectively.

Formula (6) is for the transformation from the earth station top centric frame 701 ((Rst) to satellite centric frame 901 ((Rs).

$$(\text{R}s=Tx(-\alpha_{yaw})Tz(-\alpha_{pitch})Ty(\alpha_{roll})\{Tz(\omega)Tx(i)Tz(-\Omega st)[(\text{R}sto+Tz(-90)Tx(\phi_{st}-90)(\text{R}st]-(\text{Reo}\} \quad (6)$$

Formulae (7) to (15) give all parameters used in Formula (6)

$$\breve{R}s=\begin{vmatrix}Xs\\ Ys\\ Zs\end{vmatrix}=[\ Xs,\ \ Ys,\ \ Zs\ ]^T \quad (7)$$

The notation used in Formula (7) will be used in the following text.

$$(Rst=[Xst, Yst, Zst]^T \quad (8)$$

$$(Rsto=[r_{st}\,Cos(\phi_{st}')+h_{st}\,Cos(\phi_{st}),0,r_{st}\,Sin(\phi_{st}')+h_{st}\,Sin(\phi_{st})]^T \quad (9)$$

The $h_{st}$ is the earth station altitude above the sea level in kilometers (Km). The $\phi_{st}$ is the earth centric latitude of the earth station, as shown in FIG. 11. The $\phi_{st}$ is the earth station geographic latitude. Since the earth is a deformed sphere in north-south direction, the $\phi_{st}$ is not equal to $\phi_{st}$.

$$\phi_{st}'=Atan[(1-f)^2\,Tan(\phi_{st})] \quad (10)$$

$$r_{st}=r_{eq}*(1-f)/[1-f((2-f)Cos^2(\phi_{st}')]^{1/2} \quad (11)$$

$r_{eq}$ (=6378.137 Km) is the earth's radius in the equator plane. The f (=0.0033528131) is the flattening constant of the earth.

$$(Reo=[r_a, 0,0]^T \quad (12)$$

The $r_a$ (=42164.57 Km) is the distance from the earth center to the geo-stationary satellite 412.

The Ω is the Delta longitude from the satellite 412 to the satellite's ascent node. The $t_n$ (=$t-t_{n0}$) is time in the day starting from the time when satellite 412 passes the ascend node and $\omega_{earth}$ (=360.98564 Degrees/day) is the rotation rate of the earth.

$$\Omega=\lambda s-\lambda sn+\psi_{earthtn} \quad (13)$$

$$\Omega_{st=\lambda st-\lambda sn+\Omega} \quad (14)$$

ψ is the earth centric angle in the satellite's orbital plane from the ascent node to the satellite's current position.

$$\psi=Acos(Cos\,\phi_s\,Cos\,\Omega) \quad (15)$$

Formula (16) is for the transformation from satellite centric frame 901 ((Rs) to earth station top centric frame 701 ((Rst).

$$(Rst=Tx(90-\phi_{st})Tz(90)\{Tz(\Omega_{st})Tx(-i)Tz(-\psi)\quad[Ty(-\alpha_{roll})Tz(\alpha_{pitch})Tx(\alpha_{yaw})(Rs+(Reo]-(Rsto\} \quad (16)$$

Formula (17) is for the transformation from satellite centric frame 901 ((Rs) to the earth centric frame 801 ((Re).

$$(Re=Tz(\Omega)Tx(-i)Tz(-\psi)[Ty(-\alpha_{roll})Tz(\alpha_{pitch})Tx(\alpha_{yaw})(Rs+(Reo] \quad (17)$$

$$(Re=[Xe, Ye, Ze]^T \quad (18)$$

In the earth station topic frame 701, as shown in FIG. 7, the Azst angle of the satellite's Azimuth from the north direction, the ELst angle of the satellite's Elevation from the horizontal plane, and the distance (Rstsc) between the satellite 412 and an earth station can be calculated using formulae (19) to (21) derived below.

In the satellite centric frame 901, the satellite 412 is at the origin and the satellite position vector is (Rso=[0, 0, 0]$^T$. Using the (Rso to replace the (Rs in Formula (16), the satellite vector ((Rsto) in the earth station topic frame 701 is found: (Rsto=[Xsto, Ysto, Zsto]$^T$.

The distance between the earth station and the satellite 412 (Rstsc) is:

$$Rstsc=(Xsto^2+Ysto^2+Zsto^2)^{1/2} \quad (19)$$

The azimuth and the elevation angles of the satellite 412 are as follows:

$$Azst=Atan[Xsto/Ysto] \quad (20)$$

The quadrant is determined by the signs of Xsto and Ysto, as shown in Table 2 below.

TABLE 2

| Quadrant | I | II | III | IV |
|---|---|---|---|---|
| Sign of Xsto | + | + | – | – |
| Sign of Ysto | + | – | – | + |

$$ELst=Asin\,[Zsto/Rstsc] \quad (21)$$

Formulae (22) to (31) are derived below for calculations of the latitude and longitude of the satellite antenna beam pointing position on the earth, i.e., where on the earth the satellite beam center falls. In the satellite centric frame 901, the satellite 412 is at the origin and Azs and ELs are the azimuth and elevation angles of the satellite antenna 501 beam pointing. The satellite's position vector ((Rso) and the antenna beam pointing unit vector ((Rsptu) are as follows: (Rso=[0, 0, 0]$^T$ and (Rsptu=[−Cos (ELs)Cos(Azs), −Cos (ELs) Sin(Azs), Sin(ELs)]$^T$.

The vectors (Resp, from the earth center to the end of (Rsptu, and the vector (Reso, from the earth center to the satellite 412, as shown in FIG. 12, can be found from Formula (17) using (Rso and (Rsptu to replace the (Rs respectively, with (Reptu=(Resp−(Reso.

$$\gamma=Acos[((Reso\quad(Reptu)/(|(Reso||(Reptu|)|(Rep|^2=|(Reso|^2+|(Rept|^2-2|(Reso||(Rept|Cos\,\gamma \quad (22)$$

Here, (Rept is a vector from the satellite 412 to the antenna beam pointing position on the earth, and (Rep is a vector from the earth center to the antenna beam pointing position on the earth.

$$|(Rept|^2-2|(Reso|Cos\,\gamma|(Rept|+|(Reso|^2-|(Rep|^2=0 \quad (23)$$

$$B=-2(Reso|Cos\,\gamma \quad (24)$$

$$C=|(Reso|^2-|(Rep|^2 \quad (25)$$

$$|(Rept|=[-B-(B^2-4C)^{1/2}]/2 \quad (26)$$

$$(Rept=|(RRept|(Reptu \quad (27)$$

$$|(Rep|=|(Rept+(Resp| \quad (28)$$

$$|_{ep}=Asin(Zep/|(Rep|) \quad (29)$$

$$\Delta\lambda_{ep}=Atan(Yep/Xep) \quad (30)$$

$$\lambda_{ep}=\lambda s+\Delta\lambda_{ep} \quad (31)$$

Using the formulae (10) and (11), the new (Rep is calculated with the $\phi_{ep}$, and the $\phi_{ep}$ and $\lambda_{ep}$ are recalculated using formulae (23) to (31) with the newly calculated (Rep. This iteration improves the precision of the calculation.

Figure 1:
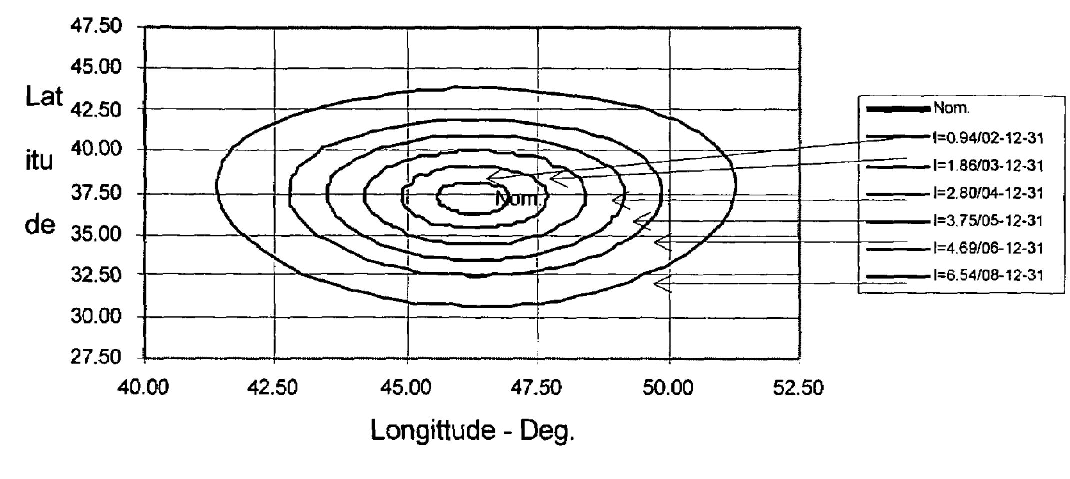
FIG. 1 is a simplified depiction of beam pointing positions on the earth of a satellite antenna for six different inclinations.
Figure 2:
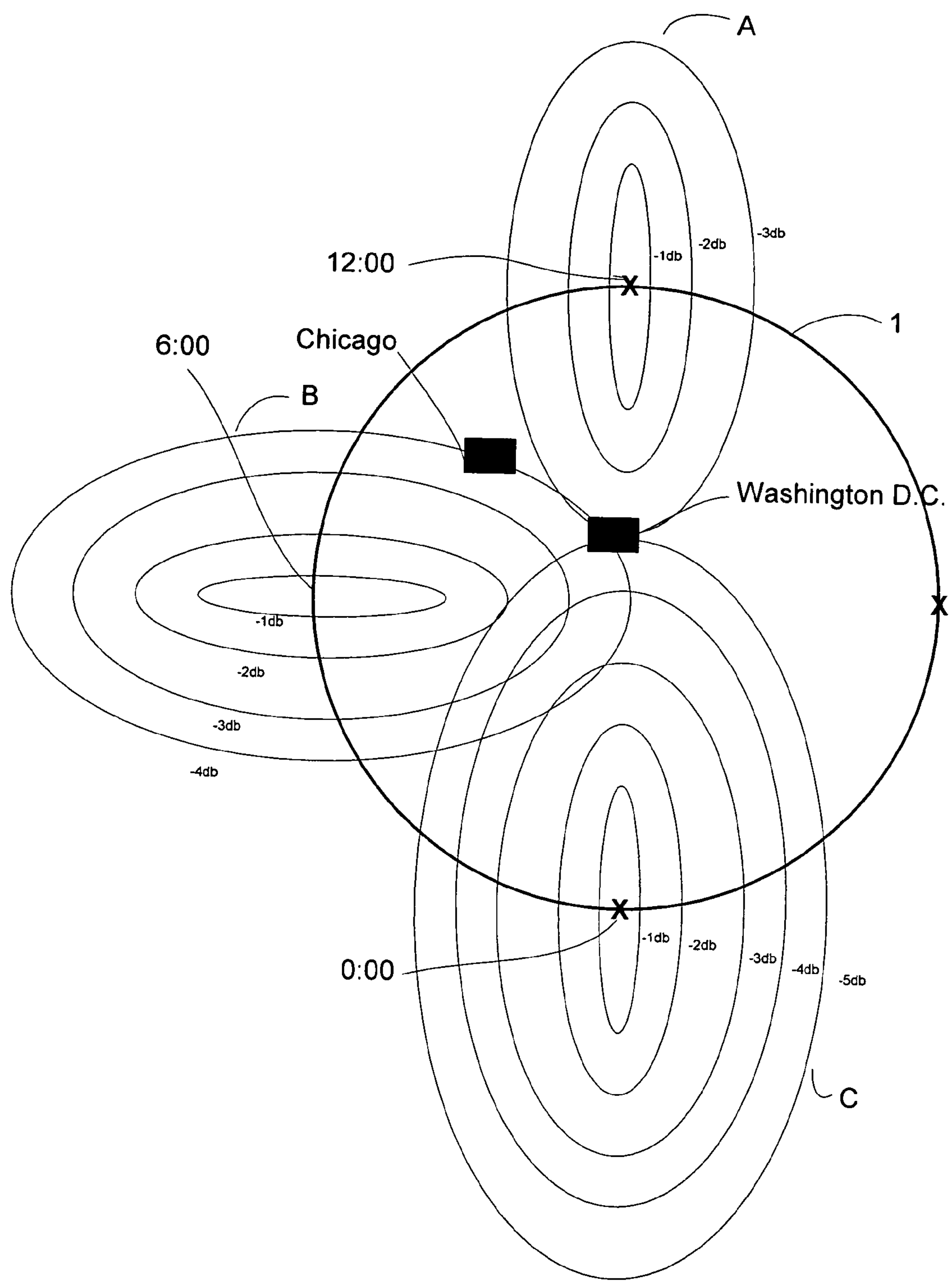
FIG. 2 is a simplified depiction of signal loss of associated with a satellite in an inclined orbit.
Figure 3:
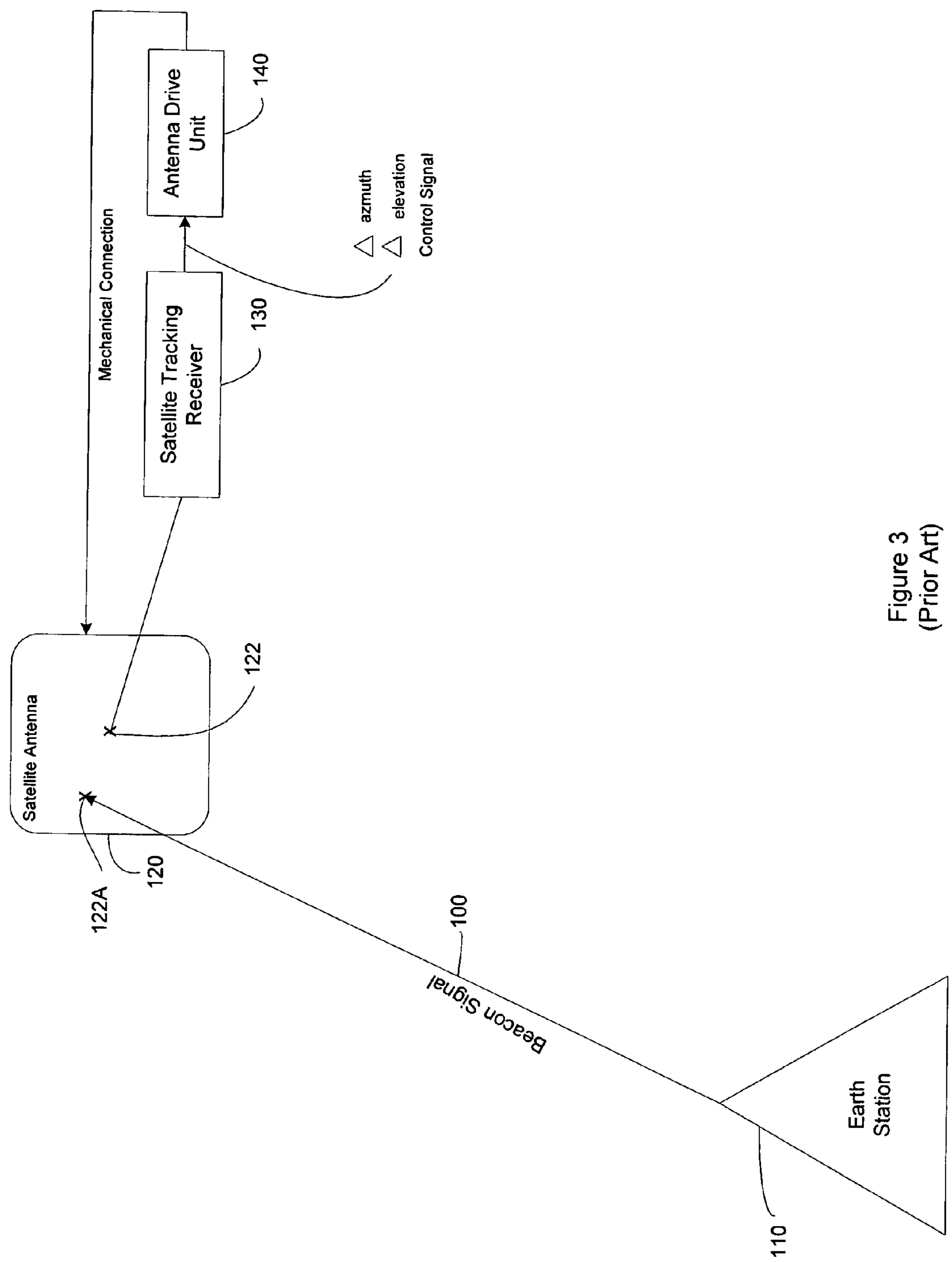
FIG. 3 depicts a proposed prior art technique for satellite positioning when a satellite is in an inclined orbit utilizing a beacon signal.

For a given antenna 501 beam pointing position, the locus of the beam pointing on the earth is an ellipse, as shown in FIG. 1 and discussed above, when the satellite 412 is in an inclined orbit.

Formulae (32) and (33) are derived below for calculations of azimuth and elevation angles of satellite antenna 501 beam pointing on the satellite centric frame 901 for a given beam pointing point on the earth. In the earth station (the desired satellite antenna nominal beam pointing on the earth) top centric frame 701, the satellite antenna 501 beam pointing position is at the origin and the beam pointing vector of (Rstp is as follows: (Rstp=$[0, 0, 0]^T$.

Using (Rstp and the latitude and longitude of the beam pointing position to replace the (Rst, $\phi_{st}$ and $\lambda_{st}$ in Formula (6), the satellite antenna 501 beam pointing position on the satellite centric frame 901 ((Rsstp) can be found: (Rsstp=$[Xsstp, Ysstp, Zsstp]^T$.

The satellite beam pointing azimuth and elevation angles, Azs and Els, are as follows:

$$Azs=Atan(Ysstp/(-Xsstp) \tag{32}$$

$$ELs=Asin[Zsstp/(Xsstp^2+Y\ sstp^2+Z\ sstp^2)^{1/2}] \tag{33}$$

Figure 13:
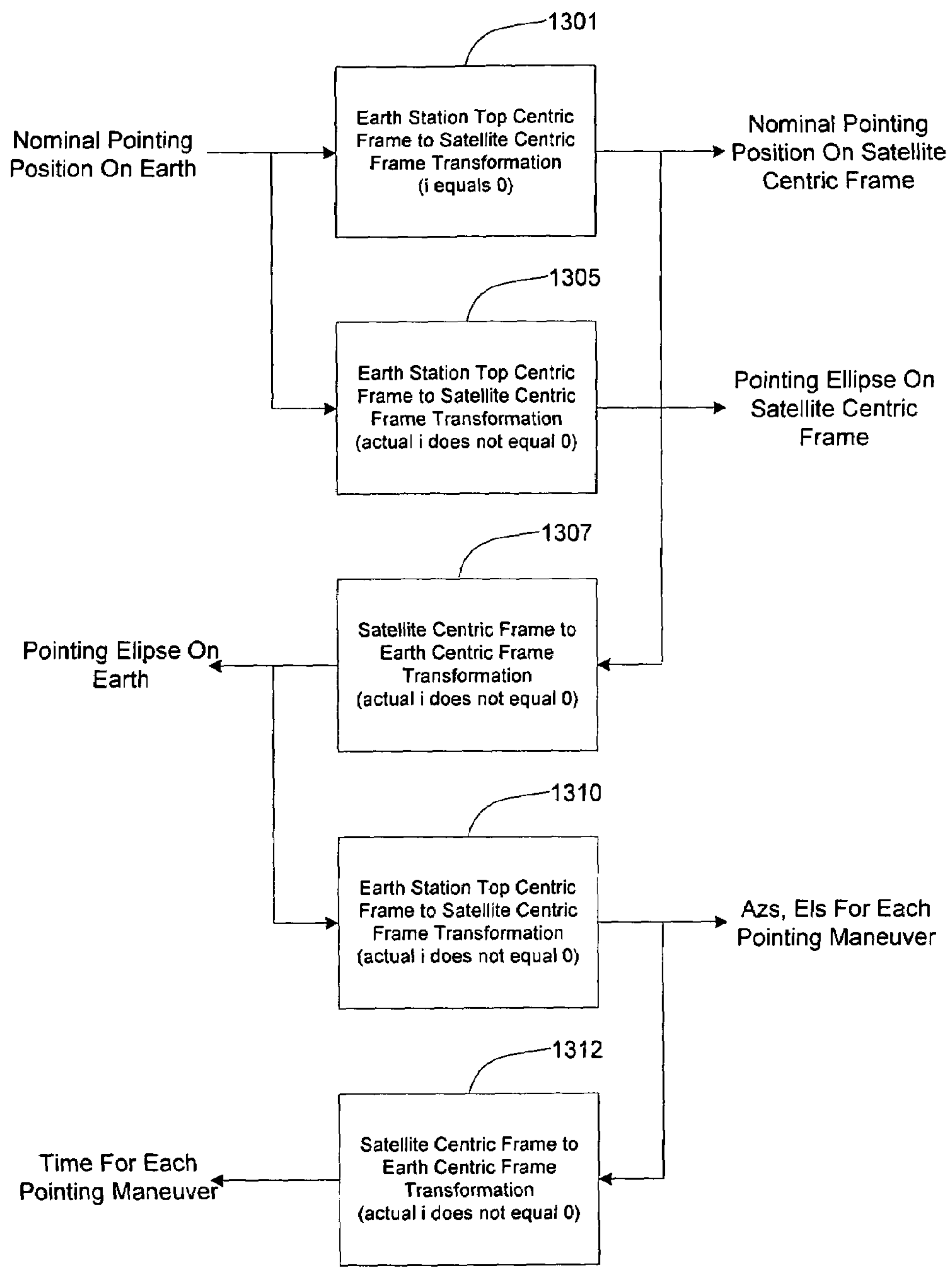
FIG. 13 is a simplified depiction of an algorithm performed by the SACK programming shown in FIG. 4.

FIG. 13 is a simplified flow block diagram of portions of the algorithm implemented by the SACK programming 401. At step 1301, based upon the satellite's nominal beam pointing position on the earth, an earth station top centric frame to satellite centric frame transformation is performed, with the satellite's inclination (i) set to zero. This gives the satellite's nominal beam pointing position in terms of the satellite centric frame. At step 1305, which may be performed concurrently, before, or after, step 1301, another earth station top centric frame to satellite centric frame transformation is performed, this time with the satellite's actual inclination. This describes the satellite antenna beam pointing ellipse due to an inclined orbit in a satellite centric frame.

Using the results from step 1301, at step 1307 a satellite centric frame to earth centric frame transformation is performed, with the satellite's actual inclination. This transformation yields the satellite's beam pointing position on the earth in an earth centric frame. Utilizing results from step 1307, at step 1310 an earth station top centric frame to satellite centric frame transformation, with the satellite's actual inclination. This yields, as will be further discussed below, Azs and Els values for each beam pointing maneuver to bring the satellite's beam pointing position within the optimal box.

Then, based upon the results from step 1310, a satellite centric frame to earth centric frame transformation, with the satellite's actual inclination, is performed. This yields the time, as will also be further discussed below, that each beam pointing maneuver should be performed.

As discussed above, the locus of the satellite antenna 501 beam pointing position on the earth is an ellipse for a given nominal antenna beam pointing when the satellite 412 is in an inclined orbit. If the ellipse is broken into pieces, each piece is an arc. Each piece (arc) can be moved close to the nominal beam pointing position by satellite antenna pointing adjustment such that the center point of that arc passes through the nominal beam pointing position. For each above adjustment of the satellite antenna 501 beam pointing position, a new ellipse on the earth is created. The antenna beam pointing will move with time on the newly created ellipse and pass the nominal beam pointing position on the earth at the time when the antenna beam pointing position passes the midpoint of the arc segment if the satellite antenna beam pointing was not adjusted. If daily multi-adjustments are performed in this way, multi ellipses are created. The satellite antenna beam pointing position will move with time on different ellipses and pass the nominal beam pointing position on the earth at the times when it passes the midpoint of each arc if the daily multi-adjustments were not performed. The length of the arc between the antenna nominal point and points on all ellipses created can be calculated using formulae (34) to (36). The time to perform each antenna adjustment is determined by the rule of minimum arc length.

$$\beta=Acos[Cos(\phi_1)Cos(\lambda_1-\lambda_2)] \tag{34}$$

$$\delta=Atan[Tan(\phi_1)/Sin(\lambda_1-\lambda_2)] \tag{35}$$

$$Arc=Acos[Cos\beta Cos(\phi_2)+Sin\beta Sin(\phi_2)\ Sin(\delta)] \tag{36}$$

FIG. 14 shows an example of the antenna beam pointing position where two beam pointing maneuvers are performed in a single day. As shown, the satellite beam pointing position moves with time in two arcs that come from two created ellipses. With an increase in the number of beam pointing maneuvers, the beam pointing positions will more closely track to the nominal position. FIGS. 15 through 17 show examples for, respectively, performance of 4, 8 and 16 daily beam pointing maneuvers. As can be seen in these figures, the more daily beam pointing maneuvers performed, the more closely the satellite beam pointing position tracks to the desired nominal satellite beam pointing position on the earth.

The breaking of the inclined orbit ellipse into segments can be performed, as desired, in different ways, i.e. equal arc length or equal time period etc. Also, the movement of each resulting piece to the center area can also be performed, as desired, in different ways, i.e. keeping arc center passing or close to nominal position etc. The SACK programming 401 can be, as desired, loaded onto the satellite's onboard computer to implement this technique according to a predetermined, i.e., programmed, routine.

FIG. 18 and table 3 show predicted results utilizing the SACK technique on a satellite at 50.50° E over a period of six years. The inner most ellipse in FIG. 18 is the locus of an antenna beam pointing position when the satellite inclination is at 0.94° on Dec. 31, 2002, and the most outside ellipse in FIG. 18 is the locus of an antenna beam pointing position when the satellite inclination is at 6.54° on Dec. 31, 2008. The loci are moved into the center area around the nominal beam pointing position by utilizing the SACK technique described herein, as shown in FIG. 18.

Table 3 shows predicted results of using the SACK technique on this satellite. For example, by performing 16 daily maneuvers the beam pointing position is moved from the ellipse due to the 6.54° inclination into inside of an ellipse due to a 0.94° inclination over 74% of time, inside of an ellipse due to a 1.86° inclination over 100% of time. Thus the equivalent inclination is reduced from 6.54° to 0.94° over 74% of time and to 1.86° over 100% of time. The variation with inclination of 6.54° on 31 Dec. 2008 is reduced to the level on 31 Dec. 2002, 6 years previous over 74% of time or to the level on 31 Dec. 2003, 5 years previous over 100% of time. Table 3 lists other examples.

TABLE 3

Predicted Results of SACK of Antenna Beam pointing (37.18 N, 46.27 E) of a Satellite at 50.50° with inclination of 6.54° on Dec. 31, 2008

| Daily Maneuver Numbers | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| % of Time | 8 | 14 | 19 | 24 | 27 | 33 | 36 | 40 | 47 | 49 | 56 | 59 | 65 | 68 | 74 |
| Variation of the beam pointing position on the earth is better (smaller) than an inclination of 0.94°, equivalent the inclination is reduced by 5.6°, equal to 6 years back. | | | | | | | | | | | | | | | |
| % of Time | 17 | 27 | 39 | 45 | 54 | 64 | 74 | 81 | 88 | 92 | 97 | 97 | 100 | 100 | 100 |
| Variation of the beam pointing position on the earth is better (smaller) than an inclination of 1.86°, equivalent the inclination is reduced by 4.68°, equal to 5 years back | | | | | | | | | | | | | | | |
| % of Time | 25 | 42 | 58 | 69 | 83 | 93 | 98 | 100 | 100 | | | | | | |
| Variation of the beam pointing position on the earth is better (smaller) than an inclination of 2.80°, equivalent the inclination is reduced by 3.74°, equal to 4.0 years back | | | | | | | | | | | | | | | |
| % of Time | 33 | 56 | 76 | 91 | 99 | 100 | 100 | | | | | | | | |
| Variation of the beam pointing position on the earth is better (smaller) than an inclination of 3.75°, equivalent the inclination is reduced by 2.79°, equal to 3.0 years back | | | | | | | | | | | | | | | |
| % of Time | 43 | 74 | 96 | 100 | 100 | | | | | | | | | | |
| Variation of the beam pointing position on the earth is better (smaller) than an inclination of 4.69°, equivalent the inclination is reduced by 1.85°, equal to 2.0 years back | | | | | | | | | | | | | | | |
| % of Time | 67 | 90 | 100 | | | | | | | | | | | | |
| Variation of the beam pointing position on the earth is better (smaller) than an inclination of 6.64° equivalent the inclination is reduced by 0.0°, equal to 0.0 years back | | | | | | | | | | | | | | | |

The predicted results were validated on the West Spot beam of an Intelsat satellite at 340.05° E using the test facility at Fucino of Italy. FIG. 14 shows the validation results. SSG in FIG. 19 represents small signal gain of transponder 62/62 at the Fucino test facility. Variation of the small signal gain is equal to transmit plus receive gain variation in the Fucino direction of the West Spot beam antenna. As shown, an orbital inclination (without SACK) caused a variation of approximately 10.5 dB within 15 hours coverage. This variation was reduced to about 2.5 dB for the same period of coverage utilizing the SACK technique.

Thus, as has been shown, the inventive SACK technique reduces the variation of antenna beam pointing position on the earth caused by inclination significantly, resulting in dramatic reduction of the signal variation at an earth station. This improves the satellite's usable life.

In summary, when a satellite is in an inclined orbit, the satellite antenna beam pointing position on the earth will be off from the nominal position and move with time along an ellipse. The shape and size of the ellipse depend on the beam pointing position relative to the satellite sub-point and on inclination magnitude. It is very costly in station-keeping fuel to reduce an inclination. The station-keeping fuel onboard a satellite determines the life of the satellite.

The Satellite Antenna Coverage Keeping (SACK) technique, implemented as a SACK program, will keep the satellite antenna beam pointing position on the earth in a box area around the nominal position by performing daily multi corrections, resulting in the reduction of the beam coverage deviation from the nominal position. These multi corrections compensate for the deviation caused mainly by the satellite inclination. The more daily corrections are performed, the smaller a box around the nominal position of an antenna beam pointing will be achieved. Considering reliability of antenna driven unit on the satellite, it is preferable to use the minimum number of daily corrections necessary to achieve acceptable levels of performance (i.e., acceptable gain variation). SACK reduces signal level variation and performance degradation at earth stations and will extend the operational life up to several years of all transponders connected with the beam.

The present invention is not to be limited in scope by the specific embodiments described herein. Indeed, various modifications of the present invention in addition to those described herein will be apparent to those of skill in the art from the foregoing description and accompanying drawings. Thus, such modifications are intended to fall within the scope of the appended claims.

What is claimed is:

1. A method for redirecting a satellite antenna beam from a satellite antenna of an inclined orbit satellite to a nominal satellite antenna beam pointing position on the earth's surface, comprising:

computing satellite antenna maneuver data based upon telemetry, orbital, and antenna nominal pointing information associated with the inclined orbit satellite;

generating command code sequences corresponding to the generated maneuver data executable at the inclined orbit satellite to modify azimuth and elevation angles of the satellite antenna; and transmitting, to the inclined orbit satellite, the generated command code sequences to redirect the satellite antenna beam center close to the nominal satellite antenna beam pointing position on the earth's surface.

2. The method of claim 1, wherein:

the satellite telemetry, orbital, and antenna nominal pointing information includes satellite attitude data, satellite orbit element data, and one of i) the nominal satellite antenna beam pointing position on the earth's surface and ii) a nominal satellite antenna beam pointing position on the satellite;

the nominal satellite antenna beam pointing position on the earth's surface corresponds to a target latitude and target longitude; and the nominal satellite antenna beam pointing position on the satellite corresponds to target azimuth and target elevation angles of the satellite antenna.

3. The method of claim 2, wherein the satellite orbit element data includes a plurality of satellite orbit parameters.

4. The method of claim 1, wherein the computed satellite antenna maneuver data includes data indicating a number of satellite antenna maneuvers to be performed in a time period, a time at which to perform each of the number of satellite antenna maneuvers, and azimuth and elevation angles for each of the number of satellite antenna maneuvers.

5. The method of claim 1, wherein the satellite antenna maneuver data is computed by performing a plurality of coordinate frame transformations.

6. The method of claim 5, wherein performing the plurality of coordinate frame transformations includes:

performing an earth station top centric frame to satellite centric frame transformation based on the nominal satellite antenna beam pointing position on the earth's surface and a satellite inclination value of zero to define first parameters;

performing a satellite centric frame to earth centric frame transformation based on the defined first parameters and the actual satellite inclination value to define second parameters;

performing an earth station top centric frame to satellite centric frame transformation based upon the defined first and second parameters and the actual satellite inclination value to generate a first portion of the antenna maneuver data; and performing a satellite centric frame to earth centric frame transformation based upon the first portion of the antenna maneuver data to generate a second portion of the antenna maneuver data.

7. The method of claim 6, wherein:

the generated first portion of the antenna maneuver data identifies a number of satellite antenna maneuvers to be performed in a time period and target azimuth and elevation angles for each of the number of satellite antenna maneuvers; and the generated second portion of the antenna maneuver data identifies a time at which to perform each of the number of satellite antenna maneuvers.

8. The method of claim 1, wherein computing the satellite antenna maneuver data includes:

defining an ellipse formed on the earth's surface by the satellite antenna beam pointing position due to the inclined orbit of the satellite;

segmenting the defined ellipse into a plurality of arcs; moving each of the plurality of arcs to the nominal satellite antenna beam pointing position on the earth's surface; and determining angular distances from points on each moved arc to the nominal satellite antenna beam pointing position on the earth's surface;

wherein the satellite antenna maneuver data is at least in part computed based on the determined angular distances.

9. The method of claim 1, wherein the nominal satellite antenna beam pointing position on the earth's surface is a target latitude and target longitude of the satellite antenna beam center on the earth's surface.

10. A satellite control center for redirecting a satellite antenna beam from a satellite antenna of an inclined orbit satellite to a nominal satellite antenna beam pointing position on the earth's surface, comprising:

an interface configured to receive satellite telemetry, orbital, and antenna nominal pointing information associated with the inclined orbit satellite;

a processor configured to compute satellite antenna maneuver data based upon the received information, and to generate command code sequences corresponding to the generated maneuver data executable at the inclined orbit satellite to modify azimuth and elevation angles of the satellite antenna; and a transmitter configured to transmit, to the inclined orbit satellite, the generated command code sequences to redirect the satellite antenna beam center close to the nominal satellite antenna beam pointing position on the earth's surface.

11. The satellite control center of claim 10, wherein:

the satellite telemetry, orbital, and antenna nominal pointing information includes satellite attitude data, satellite orbit element data, and one of i) the nominal satellite antenna beam pointing position on the earth's surface and ii) a nominal satellite antenna beam pointing position on the satellite;

the nominal satellite antenna beam pointing position on the earth's surface corresponds to a target latitude and target longitude; and the nominal satellite antenna beam pointing position on the satellite corresponds to target azimuth and target elevation angles of the satellite antenna.

12. The satellite control center of claim 11, wherein the satellite orbit element data includes a plurality of satellite orbit parameters.

13. The satellite control center of claim 10, wherein the computed satellite antenna maneuver data includes data indicating a number of satellite antenna maneuvers to be performed in a time period, a time at which to perform each of the number of satellite antenna maneuvers, and azimuth and elevation angles for each of the number of satellite antenna maneuvers.

14. The satellite control center of claim 10, wherein the processor if further configured to perform a plurality of coordinate frame transformations to compute the satellite antenna maneuver data.

15. The satellite control center of claim 14, wherein the processor is further configured to, in computing the satellite antenna maneuver data, i) perform an earth station top centric frame to satellite centric frame transformation based upon the nominal satellite antenna beam pointing position on the earth's surface and a satellite inclination value of zero to define first parameters, ii) perform a satellite centric frame to earth centric frame transformation based on the defined first parameters and the actual satellite inclination value to define second parameters, iii) perform an earth station top centric frame to satellite centric frame transformation based on the first and second defined parameters and the actual satellite inclination value to generate a first portion of the antenna maneuver data, and iv) perform a satellite centric frame to earth centric frame transformation based upon the first portion of the antenna maneuver data to generate a second portion of the antenna maneuver data.

16. The satellite control center of claim 15, wherein:

the generated first portion of the antenna maneuver data identifies a number of satellite antenna maneuvers to be performed in a time period and target azimuth and elevation angles for each of the number of satellite antenna maneuvers; and the generated second portion of the antenna maneuver data is a time at which to perform each of the number of satellite antenna maneuvers.

17. The satellite control center of claim 10, wherein:

the processor is further configured to, in computing the satellite antenna maneuver data, i) define an ellipse formed on the earth's surface by the satellite antenna beam pointing position due to the inclined orbit of the satellite, ii) segment the defined ellipse into a plurality of arcs, iii) move each of the plurality of arcs to the nominal satellite antenna beam pointing position on the earth's surface, and iv) determine angular distances from points on each moved arc to the nominal satellite antenna beam pointing position on the earth's surface; and the satellite antenna maneuver data is at least in part computed based on the determined angular distances.

18. The satellite control center of claim 10, wherein the nominal satellite antenna beam pointing position on the earth's surface is a target latitude and target longitude of the satellite antenna beam center on the earth's surface.

19. An article of manufacture for redirecting a satellite antenna beam from a satellite antenna of an inclined orbit satellite to a nominal satellite antenna beam pointing position on the earth's surface, comprising:

a computer readable medium; and computer programming stored on the medium;

wherein the stored computer programming is configured to be readable from the computer readable medium by a computer to thereby cause the computer to operate so as to:

receive telemetry, orbital, and antenna nominal pointing information associated with the inclined orbit satellite;

compute satellite antenna maneuver data based upon the received information;

generate command code sequences corresponding to the generated maneuver data executable at the inclined orbit satellite to modify azimuth and elevation angles of the satellite antenna; and cause the generated command code sequences to be transmitted to the inclined orbit satellite to redirect the satellite antenna beam center close to the nominal satellite antenna beam pointing position on the earth's surface.

20. The article of manufacture of claim 19, wherein the computer programming is further configured to perform a plurality of coordinate frame transformations in computing the satellite antenna maneuver data.

* * * * *